C. G. COX.
Plow.

No. 159,905.  Patented Feb. 16, 1875.

WITNESSES
Henry N. Miller
C. L. Enoch

INVENTOR
Cumberton George Cox.
per
Alexander & Mason
Attorneys

UNITED STATES PATENT OFFICE.

CUMBERLON G. COX, OF RICHMOND, VIRGINIA.

IMPROVEMENT IN PLOWS.

Specification forming part of Letters Patent No. 159,905, dated February 16, 1875; application filed December 7, 1674.

*To all whom it may concern:*

Be it known that I, CUMBERLON G. COX, of Richmond, in the county of Henrico and in the State of Virginia, have invented certain new and useful Improvements in Plows; and do hereby declare that the following is a full, clear, and exact description thereof, reference being had to the accompanying drawings and to the letters of reference marked thereon, making a part of this specification.

The nature of my invention consists in the construction and arrangement of a plow, whereby the plow-beam may be raised and lowered vertically, in order to plow deep or shallow, and be securely fastened in any position desired, as will be hereinafter more fully set forth.

In order to enable others skilled in the art to which my invention appertains to make and use the same, I will now proceed to describe its construction and operation, referring to the annexed drawing, in which—

Figure 1:
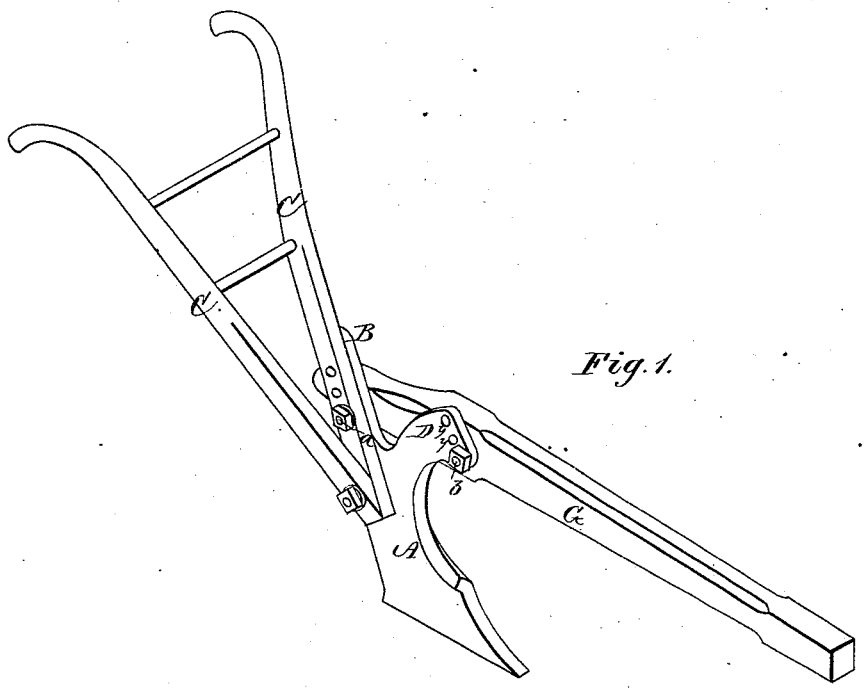
Figure 2:
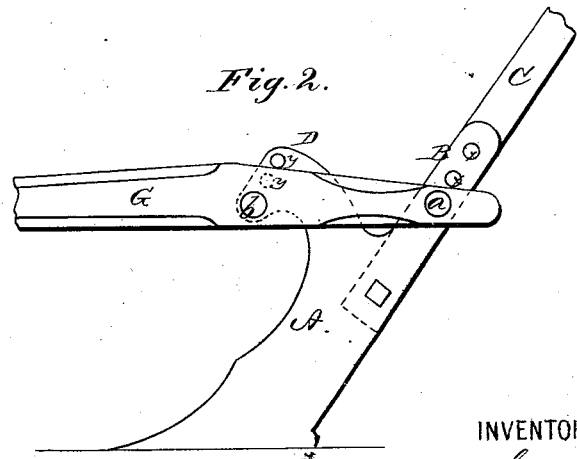

Figure 1 is a perspective view of a plow embodying my invention, and Fig. 2 is an enlarged side elevation of the rear part of the same.

A represents the land-side of a plow, from a proper point on which is extended a rigid iron arm, B, upward and backward, and at an angle to suit the pitch of the plow-handles C C. One of these handles is bolted to the arm B, thereby being more firmly secured. The arm B extends to a horizontal level with the stem D of the plow-standard, and in said arm are made a series of holes, $x\,x$, to receive the bolt $a$, that secures the back end of the plow-beam G. The top of the stem D is widened and sloped back, and provided with the same series of holes $y\,y$, in exact equidistance and equi slope and elevation as there is in the arm B, which holes receive the king-bolt B of the plow. The plow-handles C C are bolted, in proper places, to the sloping arm B. The plow-beam G is provided with holes for the king-bolt $b$, and for the tail-bolt $a$, in an exact horizontal line of the center of the beam, and at an exact distance apart, to agree with the two lower holes of the arm and stem. It is then put in place, and bolts $a\,b$ passed through, securing the beam and handles all to the plow.

To make the plow work deeper in the ground the king-bolt $b$ and tail-bolt $a$ are both withdrawn with the beam, and passed through the next higher series of holes, and this is regulated as often as necessary.

Having thus fully described my invention, what I claim as new, and desire to secure by Letters Patent, is—

The land-side plow-plate A, provided with the arm B and stem D, and having a series of holes, $x$ and $y$, made parallel with each other, in combination with the plow-beam G and bolts $a\,b$, arranged to allow the vertical adjustment of the plow-beam, as set forth.

In testimony that I claim the foregoing I have hereunto set my hand this 16th day of November, 1874.

CUMBERLON G. COX.

Witnesses:
C. L. EVERT,
P. F. NOLAND.